Sept. 9, 1924.
G. W. BOWER
COUPLING FOR INSULATORS
Filed Sept. 16, 1921
1,508,158
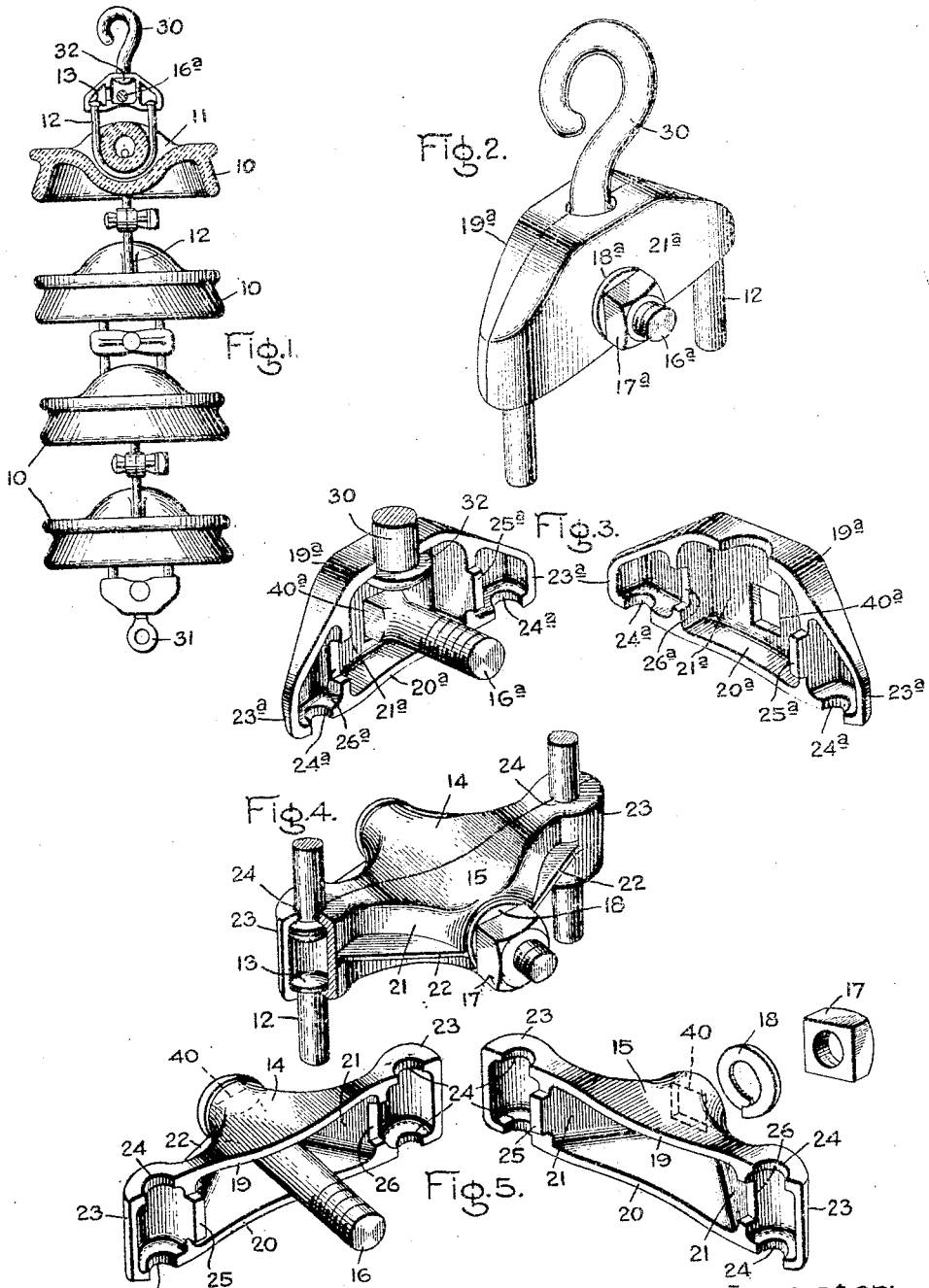
Inventor:
George W. Bower;
by [signature]
His Attorney.

Patented Sept. 9, 1924.

1,508,158

UNITED STATES PATENT OFFICE.

GEORGE W. BOWER, OF SCHENECTADY, NEW YORK, ASSIGNOR TO GENERAL ELECTRIC COMPANY, A CORPORATION OF NEW YORK.

COUPLING FOR INSULATORS.

Application filed September 16, 1921. Serial No. 501,051.

*To all whom it may concern:*

Be it known that I, GEORGE W. BOWER, a citizen of the United States, residing at Schenectady, in the county of Schenectady, State of New York, have invented certain new and useful Improvements in Couplings for Insulators, of which the following is a specification.

The present invention relates to couplings for suspension high tension insulators of the so-termed link type which comprise a number of insulator members connected together by couplings to form a string, the string being suspended from one end and supporting the wire at the other end.

The object of my invention is to provide an improved coupling for such insulators, and for a consideration of what I believe to be novel and my invention, attention is directed to the accompanying description and the claims appended thereto.

In the drawing, Fig. 1 is a side elevation partly in section of an insulator string employing couplings (usually termed hardware) embodying my invention; Fig. 2 is a perspective view of an end coupling and suspension hook; Fig. 3 is an exploded perspective view of the coupling shown in Fig. 2; Fig. 4 is a perspective view of an intermediate coupling, and Fig. 5 is an exploded perspective view of the coupling shown in Fig. 4.

Referring to the drawings, 10 indicates the insulator members which in general are made of porcelain. They may be of any suitable shape and are provided with the usual openings 11 to receive the U-shaped links 12. Links 12 have heads 13 at their ends and openings 11 are of such size that the links may be hooked into them without difficulty.

The insulator members and links illustrated are of well-known type and are to be taken as typical of any suitable structure.

My invention relates more particularly to the couplings to which the links are attached and which serve to support the insulator members and fasten them together, and in this connection I will describe first the intermediate couplings and then the end couplings.

The intermediate couplings, as shown in Figs. 4 and 5, comprise complementary halves 14 and 15 connected together by a single bolt 16 located midway of their ends. The openings 40 through which the bolt passes are square and an ordinary carriage bolt is used, the square portion of the bolt adjacent its head fitting one of the square openings to prevent it from turning so the nut 17 on it can be tightened with a single wrench. Under the nut is a lock washer 18. Complementary halves 14 and 15 are alike in structure so they are interchangeable. Each comprises flat, substantially parallel top and bottom walls 19 and 20 connected on one side by an arched side wall 21 at the apex of which is the rectangular opening 40 through which bolt 16 passes. Side wall 21 is reinforced by ribs 22. Walls 19 and 20 are shaped to cooperate with arched side wall 21 so the result is a coupling half which is arched and reinforced in a transverse plane. At the two ends of the half are semi-cylindrical housings 23 in the top and bottom walls of which are semi-circular grooves 24. At one end of the half the inner wall of the housing is provided with a projection 25 and at the other end the similar wall has a slot 26 of a size to receive a projection 25. The side of the half opposite wall 21 is open and flat except for projection 25 which extends beyond the plane of the walls.

When two complementary halves as shown in Fig. 5 are placed together as shown in Fig. 4 the projection 25 of each half fits the slot 26 of the other half and the semi-circular grooves 24 form round openings through which the ends of links 12 project, the under sides of the heads 13 engaging the walls surrounding such openings. Nut 17 is screwed up tight to hold the two halves together and projection 25 and slots 26, which form in substance a tongue and groove connection, prevent them from twisting.

The weight of the insulator is taken by heads 13 resting on the wall surrounding the openings formed by grooves 24. The pull of these heads tends to spread apart the two halves 14 and 15 at their ends and the function of the arched construction is to strengthen the halves in a transverse direction so they will be strong enough to withhold the forces tending to spread them. By the use of this arched construction the coupling may be made comparatively light in weight, of small dimensions, and of a length equal to the distance between the arms of the U-shaped links 12. It is therefore not necessary to bend the arms of links 12 toward each other after the hook has been hooked into engagement with an insulator member in order to fasten its ends to a coupling. This avoids the possibility of breaking or putting strains on the insulator member when building up an insulator string as shown in Fig. 1; it also avoids any side bending effect on the insulator members, and thus allows a higher stress to be placed on the string.

In Figs. 2 and 3 is illustrated a connector embodying my invention but modified for use at the top or bottom of a string, it being provided with a hook 30 when used at the top or an eye 31 when used at the bottom.

In Figs. 2 and 3 parts corresponding to those of Figs. 4 and 5 are designated by the same reference numerals with the exponent "a" added. The two side walls 21ª are arched to give strength in a lateral direction to prevent spreading at the ends and the wall 19ª slopes upward from its two ends and has a flat top at its center in which is an opening through which the end of hook 30 extends, a head 32 on the end of the hook engaging the wall surrounding such opening.

String insulators of this type are usually assembled in the field by the lineman and it is of great advantage to have couplings which are easy to use, requiring no tools except an ordinary wrench and requiring no bending together of the ends of the U-shaped links 12. By reason of the arched construction I am enabled to make the couplings sufficiently long to take the ends of the links without requiring that they be bent toward each other, while at the same time the coupling is not unduly heavy and is strong and rigid enough that it will not spread at the ends. Such couplings are made as castings and are used in large quantities, and it is essential that they take as little material as possible to limit their weight and cost. My coupling is light in weight so it can be produced at a low cost but at the same time is amply strong.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A coupling for the U-shaped supporting links for insulators, said coupling comprising flat top and bottom walls and arched side walls, said top and bottom walls being provided at their ends with openings spaced to receive the two ends of supporting links, and said coupling being split in a longitudinal, vertical plane through the centers of said openings, and a bolt which passes transversely through the arched side walls to hold the parts of the coupling together.

2. A coupling for the U-shaped supporting links for insulators, said coupling comprising flat top and bottom walls and arched side walls, said top and bottom walls being provided at their ends with openings spaced to receive the two ends of supporting links, and said coupling being split in a longitudinal, vertical plane through the centers of said openings, a bolt which passes transversely through the arched walls to hold the parts of the coupling together, and means forming a tongue and groove connection between said parts to prevent their turning relatively to each other.

3. A coupling for insulators of the suspension type comprising complementary halves, each having a laterally arched side wall exteriorly webbed longitudinally and each having flanges forming top and bottom walls which meet in edge to edge engagement when the halves are drawn together, and a bolt for drawing together and holding said halves in engagement, said bolt being passed through openings in each half midway between the ends of each half and at a right angle to the common plane of the meeting edges, said meeting edges being provided with complementary grooves forming a plurality of parallel openings spaced to receive standard U-shaped supporting links.

4. A coupling for insulators of the suspension type comprising a pair of closed end channel bars forming complementary halves and being held together in edge to edge engagement so that the bottoms of the channels form the opposed side walls and the top and bottom flanges form top and bottom walls respectively of a hollow girder structure, the opposed channel bottoms being convexly arched and webbed exteriorly in the direction of their length, and each channel bar being provided interiorly with a pair of webs between its flanges, and carrying means for positioning the halves with respect to each other, said channel bars having complementary grooves in the engaging edges of the flanges forming openings to receive and hold the headed ends of insulator coupling links by the neck portion thereof.

In witness whereof, I have hereunto set my hand this 15th day of September 1921.

GEORGE W. BOWER.